May 3, 1955

W. H. BERETISH 2,707,390

VALVE TESTING DEVICE

Filed Dec. 15, 1948

INVENTOR
William H. Beretish

By Strauch + Hoffman
Attorneys

May 3, 1955

W. H. BERETISH 2,707,390

VALVE TESTING DEVICE

Filed Dec. 15, 1948

INVENTOR
William H. Beretish

By *Strauch & Hoffman*

Attorneys

United States Patent Office 2,707,390  
Patented May 3, 1955

2,707,390

VALVE TESTING DEVICE

William H. Beretish, Chicago, Ill., assignor to Edward Valves, Inc., East Chicago, Ind., a corporation of Indiana Application December 15, 1948, Serial No. 65,411

4 Claims. (Cl. 73—46)

This invention relates to apparatus for testing two mating parts of a valve for the amount of leak therebetween and for relative concentricity when assembled in their normal operating relationship.

Fluid control valves have a number of parts such as the body, stem, handle, stuffing box and the two mating parts which control the fluid flow, namely the valve seat and its cooperating element whether it be a disc, ball, plug, or other type. It is necessary that the assembled seat and closure be tested in order to determine whether or not they operate satisfactorily. It is a time consuming operation to complete the assembly of the valve before it is tested, and if it is found not to meet specifications it must be disassembled again and reworked or the seat and closure discarded in the event that they fail the test so completely that they cannot be reworked. However, it has been customary to completely assemble them in this manner before testing them so that they could be tested under operating conditions.

In accordance with my invention however, it is possible to test a valve seat with its mating closure or closures under simulated operating conditions without first assembling them into a complete valve structure. Thus the time otherwise required to assemble the complete valve structure is saved. In accordance with my invention each valve seat with its mating closure may be quickly placed upon a testing base where they may be pressed together with a controlled force commensurate with the force that they will be subjected to under operating conditions. While held together in this manner they are tested under vacuum conditions and the amount of vacuum that they will hold is readily ascertained. Since the effectiveness of the seal between the seat and closure is readily determined, they may be separated into several classifications depending upon their relative effectiveness. Briefly, depending upon the amount of vacuum that they will maintain, they may be classified as exceptionally good, acceptable, those needing lapping of the mating parts, those needing rejointing, and those which are so bad that they cannot be reworked or salvaged.

In view of the fact that normal wear of the cutting tools will cause consecutively manufactured parts to vary, it is important that inspection of the seats and closures be made as soon as possible after they have been manufactured, and at a rapid rate corresponding to the rate of manufacture, so that if tests indicate that there is some fault in the manufacture, resulting from wear of the cutting tools or the like, steps can be taken to correct the conditions as soon as possible before any number of such parts are manufactured with faults that require them to be reworked or to be completely discarded. The apparatus constructed in accordance with my invention permits inspection of the mating seats and closures at a rate corresponding to that of the rate of manufacture. In the past machined parts have been tested for unevenness by determining the amount of vacuum that can be maintained between their machined surfaces and a standard surface. Such a system is illustrated in the Patent No. 1,901,966 issued to R. E. Hoffman. In my apparatus however, each part is inspected while mated with the particular part that it will be assembled with in a completed valve, and the force with which the two mating parts are held together is predetermined and positively controlled so as to simulate the conditions under which they will be used. The apparatus is arranged so that mating pairs of seats and closures can be tested and classified with great rapidity and the tests can be made without requiring more than nominal skill on the part of the operator.

It is therefore the principal object of my invention to provide apparatus for checking two or more mating machine elements such as a valve seat and a closure, for the amount of leak therebetween when assembled under normal operating conditions, thereby establishing whether they will be satisfactory for their intended purpose and the accuracy of the machining operations by which they were produced.

It is another object of my invention to provide an improved apparatus for testing the efficiency of the seal between a valve seat and its closure and wherein each seat and closure may readily be tested and classified as to fit.

It is another object of my invention to provide an improved apparatus for holding an assembled valve seat and closure together without first being combined into the complete valve structure, and testing them under simulated operating conditions.

Other objects will become apparent as the description proceeds in connection with the accompanying drawings, wherein.

Figures 1, 2:
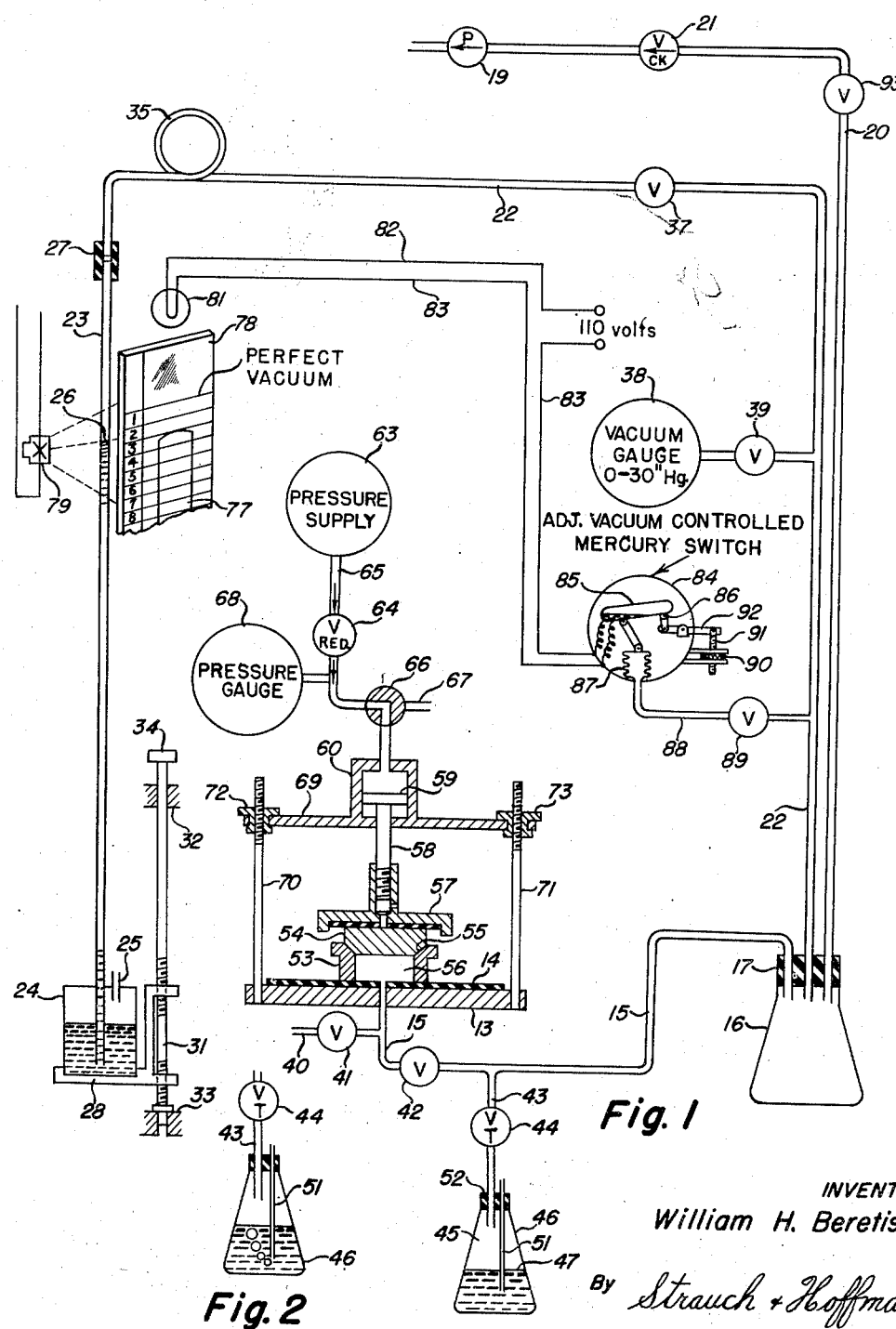
Figure 1 is a schematic diagram illustrating the method and apparatus of my invention.
Figure 2 represents a portion of Figure 1 while the apparatus of Figure 1 is being calibrated.

Referring to Figure 1, a rigid test base 13 has a test pad 14 of rubber or the like cemented to its top surface. The base and the pad are bored to receive a vacuum line 15, the other end of which passes through a sealing stopper 17 at the entrance to a trap 16. A vacuum pump 19 is connected by a vacuum line 20 to the trap 16, there being a check valve 21 between the pump and the trap to prevent fluid flow in the reverse direction, from the pump to the trap. Also connected to the trap 16 by a vacuum line 22 is the upper end of the glass tube 23 of a mercury manometer of the type having a mercury cistern 24 which is open to the atmosphere at 25. The vacuum lines 15, 20 and 22 may be of any suitable material which will withstand a normal amount of vibration and which can be suitably sealed at all of the joints to prevent air leakage and consequent vacuum loss, such as copper, glass, or non-collapsible rubber tubing. The manometer tube 23 is normally made of glass in the conventional manner, but for the purposes of the invention at least the upper end thereof for a considerable range must be of glass so that the position of the mercury meniscus 26 can be observed. The vacuum line 22 is joined to the upper end of the manometer tube 23 by means of any suitable connection 27 such as a short length of rubber tubing, although if the vacuum line 22 is formed of non-collapsible rubber tubing it may be clamped to the top of the manometer tube 23.

The entire mercury manometer including the cistern 24 and the tube 23 are mounted for adjustment vertically so that compensation may be made for variations in atmospheric pressure and temperature. In the illustrated embodiment the manometer is carried by a bracket 28 which is supported by a threaded shaft 31 mounted for rotation about a vertical axis in a pair of fixed supports 32 and 33. When the shaft 31 is rotated by means of its integral knob 34 the mercury manometer is raised or lowered depending upon the direction of rotation of the shaft 31. The amount of vertical adjustment of the manometer that will be required is not very large but the vacuum line 22 should be provided with means such as a loop 35 adjacent the upper end of the manometer tube 23 to permit such movement of the tube 23, particularly if the vacuum line 22 is of a material more rigid than rubber tubing. The vacuum line 22 is advantageously provided with a cut off valve 37 and also with a vacuum gage 38 which may be cut off by means of a valve 39.

Between the test base 13 and the trap 16 the vacuum line 15 is provided with an atmospheric air inlet conduit 40 having a cut off valve 41 therein, there being another cut off valve 42 between the conduit 40 and the trap 16 for a purpose to be described. Also, in the vacuum line 15, between the aforesaid cut off valve 42 and the trap 16 is a conduit 43 connected through a throttle valve 44 to the air space 45 in the top of a transparent flask 46 which is partly filled with water up to a line indicated by the reference number 47. A glass tube 51 extends through a sealing stopper 52 in the neck of the flask so that its upper end is open to the atmosphere and its lower end extends a distance below the water level 47 within the flask. The tube 51 has been found to work satisfactorily for its intended purpose when it has an interior diameter of approximately 7/16 of an inch, and with its lower end extending from 2 to 3 inches below the water level 47. The throttle valve 44 is normally closed while valve seat and closure assemblies are being tested and classified, but it is slightly opened and adjusted to control the passage of air into the vacuum line 15 when calibrating the testing apparatus, as will be described.

Figure 3:
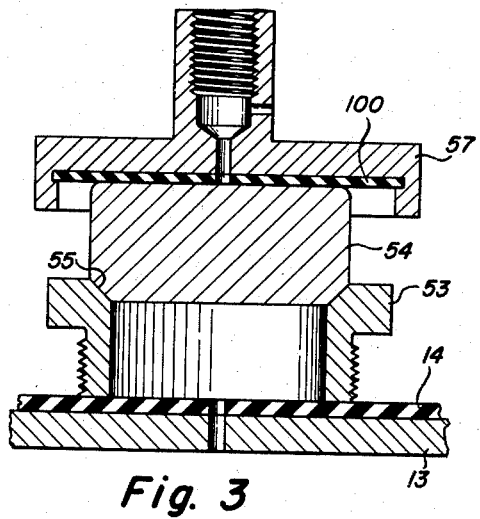
Figure 3 is an enlarged view of the cooperating valve seat and closure illustrated in Figure 1.

In the schematic diagram of Figure 1, a mating valve seat 53 and closure 54 of the type shown in Figure 3 are shown mounted upon the rubber test pad 14. The mating machined surfaces under test for accuracy of machining, concentricity, and for sealing effectiveness are the mating conical surfaces indicated by the line 55. The space 56 within the body of the valve seat 53 and beneath the closure 54 is connected to the vacuum line 15 by the bore through test base 13 and the pad 14. Thus when a vacuum is applied to the system by closing the valve 41 and operating the vacuum pump 19, the system including the space 56 within the valve seat will be evacuated, and the sealing surfaces under test will be subjected to the vacuum on one side and to atmospheric pressure on the other. In order to assure that there is no leakage between the test pad 14 and the seat 53 where the seat rests upon the test pad, a sealing compound such as Vaseline, glycerine or the like may be used to prevent leakage of air therebetween although normally they will not be needed.

The closure 54 is pressed against the surface 55 of the seat 53 by an adapter 57 that is connected as by threads or the like to a piston rod 58 on a piston 59 in a cylinder 60.

Air under pressure from a pressure supply source 63 which may be a pressure pump or high pressure cylinder or the like, is controlled by an adjustable pressure reduction valve 64 in a conduit 65 between the pressure supply source 63 and a two way valve 66 which may selectively connect the cylinder above the piston 59 either to the pressure supply source 63 or to the atmosphere through a conduit 67. The pressure that is applied to the piston 59 to force the closure 54 against the surface 55 is indicated by a pressure gage 68 and controlled by the adjustable pressure reduction valve 64. In order to release the pressure from the cylinder 60 the two way valve 66 is turned through 90 degrees so as to connect the cylinder 60 to the atmosphere by way of the conduit 67. In order to provide for a vertical adjustment of the piston and cylinder 60 so that seats and closures of various sizes may be tested, the cylinder 60 is integral with a yoke 69 that is mounted for vertical adjustment upon a pair of threaded rods 70 and 71 which are rigidly connected to the test base 13. A pair of knobs 72 and 73 are threaded onto the rods 70 and 71 and journalled for rotation in the ends of the yoke 69 so that as the knobs 72 and 73 are simultaneously rotated in one direction or the other they will raise or lower the yoke 69 and the cylinder 60 carried thereby.

With the vacuum pump maintained operating continuously and an assembled valve seat and closure 53 and 54 mounted upon the test pad and pressed together by the pressure acting upon piston 59, valves 41 and 44 are closed and valves 37, 39, 42 and 93 are checked to see that they are open. The system is evacuated until the mercury meniscus 26 rises as high in the manometer tube 23 as it will go. It is apparent that if a perfect seal is formed between the valve seat 53 and its closure 54 the mercury in the tube 23 will rise to a height of approximately 29.92 inches, depending up on the actual atmospheric pressure acting upon the mercury in the cistern 24 through the vent 25.

Before actually starting to test a series of valve seats and closures the mercury manometer should first be adjusted to compensate for atmospheric pressure and temperature in the following manner. A closure of any suitable type such as for instance one similar to that shown at 54 should be placed upon the test pad 14 and held there so as to close the upper end of the bore passing through the test base and pad. Alternatively the valve 42 may be closed to seal the conduit 15 against the entrance of air, it being understood that the throttle valve 44 must also be closed at this time. The system is then evacuated so that the mercury meniscus 26 rises as high in the tube 23 as it will go after the pump has been operated a considerable length of time so that steady operating conditions have been reached. It will be apparent that the height that the mercury meniscus 26 attains under such conditions will be the same as if a perfectly seating valve seat and closure combination were being tested. Accordingly, the mercury manometer is adjusted vertically by rotating the knob 34 until the shadow 77 cast upon an illuminated ground glass scale 78 by the mercury column is even with the topmost horizontal graduation on the scale, which is indicated on the scale 78 by the legend "Perfect Vacuum." A shadow lamp which may be of the arc type indicated at 79 and which emits light from a point source, illuminates the scale 78 from the rear, and the mercury column which is located between the shadow lamp and the scale 78 casts its shadow upon the frosted glass scale as will be apparent. When the frosted glass scale 78 is located a suitable distance away from the glass tube 23 there is a considerable magnification of the mercury meniscus and its movement and the actual relative position of the meniscus can be readily obtained by noting the position of the shadow thereof against the graduations on the scale 78. After having adjusted the mercury manometer in this manner, so that when the maximum vacuum is applied the shadow of the meniscus 26 will be right at the perfect vacuum line on the scale 78 the apparatus is in condition such that a series of valve seats and closures may be tested. The checking of the position of the mercury meniscus under full vacuum conditions can be rapidly made in this manner and should be done several times a day while the testing apparatus is being used so as to avoid inaccurate test results due to fluctuating atmospheric pressures and temperatures.

Referring to Figure 1 it will be seen that the frosted glass scale 78 has graduations numbered from 1 to 8 which are placed thereon according to a standard which will be described. If the shadow of the meniscus rises all twice as far below the topmost graduation as when the rate of leak is only 60 bubbles per minute. Accordingly, the distances between all of the graduations on the scale 78 are equal.

On the scale 78 the numeral 1 lies between the topmost graduation and the second graduation, so that the numeral 1 actually represents a range between two values of vacuum in the system. When the shadow of the meniscus 26 lies between the two aforesaid graduations then the indication is that the leakage of air past the specimens being tested, and into the vacuum system, is at a rate of from 0 to 30 bubbles per minute. A specimen which will maintain the vacuum within this range in the system would be classified as a "number one" specimen, or "exceptionally good."

In order for a specimen to be classified as "acceptable" it need only maintain a vacuum such that the shadow of the meniscus is between the second and third graduations, which range is indicated by the numeral 2 on the scale 78, and corresponds to a bubble leak rate of 30 to 60 bubbles a minute through the water in the flask 46. Normally the vacuum controlled mercury switch 84 is adjusted to close the circuit to the signal lamp 81 if the vacuum in the system holds the shadow of the meniscus up to the third graduation from the top on the scale 78. The remaining graduations are also equally spaced, and the remaining numerals are located between each pair.

The calibrating device, comprising the flask 46 and throttle valve 44 and associated elements as shown in Figure 1 are not only useful in laying out the original graduations upon the scale 78 but they should also be used at periodical intervals to check the calibration of the system. Once the scale 78 is graduated in the aforesaid manner the calibrations should not change. However, the system should be checked for leaks at periodic intervals because if there is a leak any place in the system it will give an erroneous test result for the seat and closure being tested. If the indication is that there is a leak in the system there are sufficient valves which can be closed to isolate various parts of the system in the customary manner used when locating a leak in a vacuum system. For this purpose a cut off valve 93 may be located in the vacuum line 20 between the check valve 21 and the trap 16. Once the maximum vacuum has been established in the system the cut off valve 93 may be closed and the mercury in the column 23 should remain at its highest point and the shadow thereof upon the scale 78 should remain alongside the topmost graduation on the scale 78. If there is a leak it will be indicated by a slow dropping of the shadow of the meniscus on the scale 78. Having established that there is a leak in the system it can be isolated by means of the various cut off valves and after it is located it can be stopped in any conventional manner.

Figure 4:
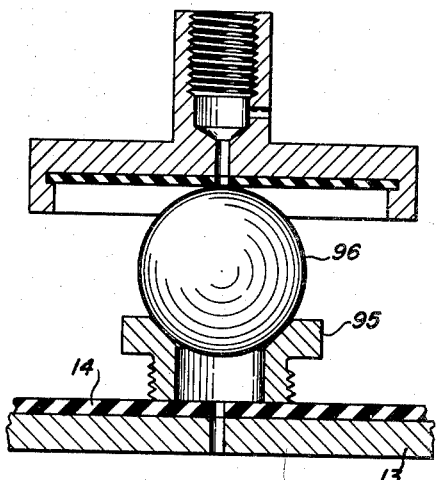
Figure 4 is a view similar to Figure 3 but showing a ball type closure.
Figure 5:
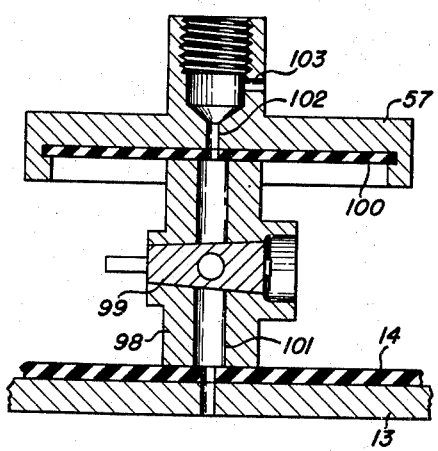
Figure 5 is a view of a plug type valve being subjected to test.

Figures 3 to 6 are illustrative of various types of mating valve seats and closure elements that may be tested with my method and apparatus. In Figure 3 the seat and closure shown in Figure 1 are illustrated in enlarged detail. In Figure 4 the seat is of similar construction but smaller in size and the closure 96 is of the ball type. Figure 5 illustrates a plug type valve having a body 98 with a tapered bore within which is rotatably mounted a mating tapered closure of the rotating plug type seating against the wall of the tapered bore through the body. When testing valves of the type shown in Figure 5 the piston 59 is ineffective to hold the plug or closure 99 against its seat in the body 98. However, the force applied by the piston is used to clamp the body of the valve in the position shown in Figure 5 between the rubber test pad 14 and a rubber gasket 100 on the adapter 57.

In this manner the vacuum and the testing system may be applied to that part of the passageway 101 in the valve body lying on the vacuum side of the closure 99. This type of valve may thus be tested and classified in the same manner as those shown in Figures 3 and 4. In order to permit atmospheric air to enter the passageway 101 in the valve body and above the closure 99 the adapter 57 is provided with a central opening 102 that communicates with the atmosphere through another opening 103.

Figure 6:
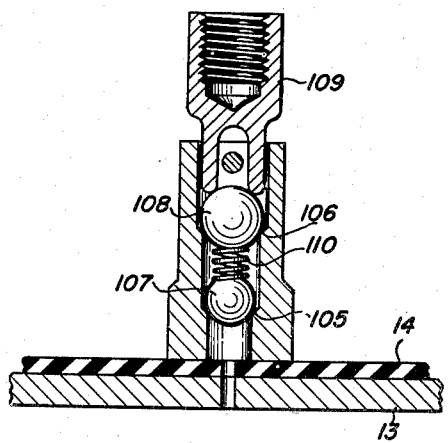
Figure 6 is an illustration of a double ball check type valve as mounted for test purposes.

In Figure 6 is shown a check type valve having two seats 105 and 106 with cooperating ball type closures 107 and 108. An adapter 109, carried by the piston rod in the same manner as the previously described adapters 57, presses against the upper closure 108 to hold it against its seat with any force corresponding to that of a spring or the like which normally holds it against its seat in the completely assembled form. The closure 107 may be held against its seat by a compression spring 110 confined between the closures 107 and 108. When both closures 107 and 108 are placed upon their seats as in Figure 6 their combined effectiveness as a check valve is tested by means of my apparatus. If desired, either closure may be tested separately, as by removing the closure 107 and testing 108 separately or by removing the closure 108 and testing the closure 107 separately, in which latter case a modified adapter 109 may be substituted so that it will extend down to engage the closure 107.

Normally the pressure which is applied by the piston 59 to hold the mating seat and closure together is quite large, and the effect of the vacuum within the chamber 56 in the valve seat is so comparatively negligible that it is not considered. This is particularly true when the diameter of the chamber 56 is small. If the valve seat being tested is of large diameter so that the total force exerted upon the closure 54 by atmospheric pressure is sufficiently large to be considered, then its force can be computed and the reducing valve 64 can be adjusted to apply a correspondingly reduced force upon the piston 59.

My apparatus therefore provides an extremely simple system for rapidly checking the two mating sealing parts of a valve or the like for leaks and accuracy of machining without having to assemble them into a complete valve structure before testing them under actual operating conditions. The seats and cooperating closures may be rapidly inserted or placed upon the apparatus and tested and classified and then rapidly removed and because of its simplicity it is not required to have a skilled operator. By testing the seats and closures as rapidly as they are manufactured it is possible to discover faults in manufacture due to wear of the tools or the like so that the faults can be corrected before any considerable number of faulty seats and closures have been made. While the apparatus has been described particularly in connection with the testing of valve seats and closures it is to be understood that it may be used for checking other types of elements having mating surfaces.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and described to be secured by United States Letters Patent is:

1. A testing apparatus comprising a test base having a passageway therein and a resilient surface adjacent said passageway adapted to have a sealing engagement with and to support one element of a test specimen in communication with said passageway; means connected to said base and operable in opposition to the yielding resistance of said surface to hold a second element of the test specimen under pressure in engagement with the first element along a pair of mating sealing surfaces therebetween with the sealing surfaces in communication with said passageway; vacuum producing means connected to said passageway and operative to maintain a vacuum in said passageway; and indicating means connected to the way up on the scale to the "Perfect Vacuum" line then it will be apparent that the seat and closure under test form a perfect seal and they may be classified as a number 1 set, or one that is exceptionally good.

When there is any leakage whatsoever between the closure 54 and the seat 53 the shadow of the meniscus on the scale 78 will not rise all of the way to the topmost graduation but will rise only to one of the lower graduations and it will be apparent that when the meniscus rises only to the graduation number 6 the leakage past the mating seat and closure is greater than if the shadow of the meniscus rises higher to one of the other graduations such as number 2. This fact permits the classification of each mating seat and closure into the arbitrarily selected groups previously mentioned, namely those that are exceptionally good, those that are acceptable, those that need lapping in order to pass the standard test, those that need rejointing, and those which must be scrapped because they cannot be refinished so as to pass the standard test.

The closure and seat are checked for concentricity by relatively shifting them, preferably while maintaining them in engagement under pressure, this being done in the present embodiment by relative rotation of closure 54 and seat 53. If the parts are not concentric increased leakage will be indicated, and the indication of maximum leakage determines classification of the parts being tested.

After a mating seat and closure has been tested and classified according to the graduation to which the shadow 77 rises on the scale 78 the vacuum pump can be kept running and the cut off valve 42 closed. The two way valve 66 is turned 90 degrees so as to exhaust the pressure in the cylinder 60 and permit the operator to raise the adapter 57 away from the closure 54. Valve 41 may be opened slightly to permit atmospheric air to enter the space 56 within the valve seat 53 so that the mating seat and closure may be removed and replaced with the next pair to be tested. After placing the next pair upon the test pad and rotating the two way valve 66 in the other direction to apply pressure upon them the valve 41 is closed again and the valve 42 is opened so that the vacuum in the system is connected to the seat and closure under test. During the time that the valve 42 is closed the mercury column will have risen in the tube 23 until a perfect vacuum has been indicated on the scale 78. When the new specimens under test are mounted and the valve 42 is opened again it will only be a short time until the vacuum in the system again reaches a steady condition depending upon the efficiency of the seal between the valve seat and closure, the shadow of the mercury column meniscus 26 necessarily dropping below the topmost graduation until it becomes steady alongside one of the other graduations, depending upon the efficiency of the seal.

Since one of the principal objects of the improved apparatus is to enable the operator to test the specimens as rapidly as possible so as to keep abreast of the output of the machines which produce the specimens, a vacuum controlled signal light indicated at 81 is placed adjacent to or behind the frosted glass scale 78 and is automatically operated in response to the attainment of a selected vacuum to indicate to the operator that the specimen being tested either meets a certain specified standard or does not meet it. The lamp 81 which may be advantageously colored green to indicate that the specimen is satisfactory, is connected to a voltage supply by means of lines 82 and 83. As indicated in Figure 1 the line 83 includes an adjustable vacuum responsive switch indicated generally at 84. In the illustrated embodiment a pivotally mounted glass tube having the required amount of mercury sealed therein, is automatically tilted one way or the other to connect or disconnect a pair of contacts passing through the walls of a tube and connected to the line 83. In the position shown in Figure 1 the tube 85 is tilted so that the mercury covers the contacts so as to close the circuit to the lamp 81. The tube 85 is pivotally mounted upon a manually adjusted pivot 86 and it is automatically rotated about this pivot in accordance with the vacuum in the trap 16 by means of a vacuum sensitive Sylphon or diaphragm device 87 which is connected by a tube 88 and a cut off valve 89 to the vacuum line 22. The position of the adjustable pivot 86 is manually controlled by a knurled nut 90 threadedly engaged with a rod 91 that is pivotally connected to a lever 92 which is in turn linked with the pivot 86. It is to be understood that the construction of the vacuum responsive switch 84 in Figure 1 is schematic only, since devices of this type are readily obtainable in the market.

The manner in which the signal lamp 81 is used is as follows. Assuming that a seat 53 and its closure 54 are acceptable for general use the seal formed therebetween will be sufficient to maintain the shadow of the mercury column meniscus on the scale 78 between graduations that are second and third from the top on scale 78. This gives a reading of "2" on the scale. The mercury switch 84 is adjusted by means of the knurled nut 90 so that the switch will close the circuit to the signal lamp 81 when the vacuum in the system is sufficient to bring the shadow of the mercury column meniscus to the third graduation from the top, where it is shown in Figure 1. It will be apparent that the operator will not have to observe the shadow of the mercury column upon the scale 78 as carefully if the signal lamp 81 lights when the specimen is being tested. If the signal lamp 81 lights during the test then the specimen is acceptable and no accurate reading of the scale 78 need be made. If however the signal lamp does not light, due to the fact that the specimen being tested will not seal the system so as to bring the vacuum to the required value then the operator can observe the exact position of the shadow on the scale 78 and classify the particular specimen accordingly.

As previously mentioned, the graduations upon the scale 78, which indicate the classification of the specimen under test, are arbitrarily selected in accordance with the following method of calibration. First, the vacuum pump 19 is started and the cut off valve 42 and throttle valve 44 are closed so that the maximum obtainable vacuum in the system will be reached. After the pump has been operating for a sufficient length of time so as to establish steady conditions, the mercury manometer is adjusted by means of the knob 39 so that the shadow of the meniscus upon the scale 78 lies alongside the topmost graduation. Now the throttle 44 is open slightly, so that atmospheric air will enter the tube 51 in the flask 46 and after bubbling through the water in the flask will enter the vacuum system through the conduit 43. The throttle valve 44 is carefully adjusted so that the number of air bubbles passing from the bottom of the tube 51 maintains a rate of 60 bubbles per minute. This setting of the throttle valve is adjusted as required so as to keep the bubbles of air entering the system at the same constant rate of 60 per minute for a sufficiently long time that a steady flow condition has been reached. It has been determined that a leak of this rate of 60 bubbles per minute is equivalent to the maximum permissible leakage between an acceptable valve seat and its closure when that particular seat and closure are tested by means of my improved method and apparatus. Accordingly the position of the shadow of the miniscus upon the scale 78 with such a leak determines the position of the third from the top line upon the scale 78. The distance that the shadow of the meniscus will drop below the perfect vacuum line on the scale 78 is directly proportional to the number of bubbles of air permitted to enter the system per minute through the glass tube 51. For that reason, if the throttle valve 44 is opened further so that 120 bubbles of air enter the system per minute, as observed in the flask 46 then the shadow of the top of the meniscus on the scale 78 will be said passageway and responsive to the vacuum produced by said vacuum producing means for indicating the rate of air flow leaking into said passageway through the mating sealing surfaces of the elements of the specimen.

2. The apparatus claimed in claim 1 wherein said means connected to the base and operable to hold the specimen elements in engagement comprises a pressure cylinder, and a piston therein, one of which is connected to said base and the other of which is provided with pressure transmitting means for engagement with the second specimen element.

3. A testing apparatus comprising a test base having a passageway therein and a resilient surface adjacent said passageway adapted to have sealing engagement with and to support one element of a test specimen in communication with said passageway; a yoke; adjustable connecting means between each end of said yoke and said test base; a pressure cylinder mounted on said yoke; a piston in said pressure cylinder one end of which is provided with pressure transmitting means for engagement with the second specimen element to hold the specimen elements in engagement under pressure along a pair of mating sealing surfaces therebetween with the sealing surfaces in communication with said passageway; vacuum producing means connected to said passageway and operative to maintain a vacuum in said passageway; and indicating means connected to said passageway and responsive to the vacuum produced by said vacuum producing means for indicating the rate of air flow leaking into said passageway through the mating sealing surfaces of the elements of the specimen.

4. In apparatus for testing and classifying the fit and sealing effectiveness of cooperating valve seat and closure elements prior to assembly in a valve; a test base; means operative to hold the cooperating seat and closure elements with their mating sealing surfaces in engagement with a constant force proportional to that by which they are engaged in normal operation and with said seat element in sealing engagement with said test base, said elements forming with said test base an enclosed space; means communicating with said space and operable continuously to evacuate said space and thereby establish a differential fluid pressure across said sealing surfaces; and means connected to the last mentioned means for indicating the rate of fluid leakage past said sealing surfaces.

References Cited in the file of this patent

UNITED STATES PATENTS

| 277,756 | Lunkenheimer | May 15, 1883 |
| 1,572,158 | Mueller et al. | Feb. 9, 1926 |
| 1,720,934 | Toleik | July 16, 1929 |
| 1,901,966 | Hoffman et al. | Mar. 21, 1933 |
| 2,254,259 | Aller | Sept. 2, 1941 |
| 2,412,638 | Swensen | Dec. 17, 1946 |
| 2,426,406 | Meyers | Aug. 26, 1947 |
| 2,467,552 | Graves | Apr. 19, 1949 |
| 2,573,646 | Koestering | Oct. 30, 1951 |

FOREIGN PATENTS

| 391,218 | Great Britain | Apr. 24, 1933 |
| 403,687 | Great Britain | Dec. 18, 1933 |